United States Patent [19]

Johnson

[11] 4,086,824
[45] May 2, 1978

[54] SPLIT LINK ACTUATOR BRAKE

[75] Inventor: David G. Johnson, Peoria, Ill.

[73] Assignee: Caterpillar Tractor Co., Peoria, Ill.

[21] Appl. No.: 778,204

[22] Filed: Mar. 16, 1977

[51] Int. Cl.² .................................................. G05G 11/00
[52] U.S. Cl. ........................................ 74/481; 74/491; 74/512; 188/106 R
[58] Field of Search ................ 74/481, 480 R, 479, 74/482, 491, 474, 471; 180/82 B; 188/105, 106 R, 106 P

[56] References Cited

U.S. PATENT DOCUMENTS

| 3,508,454 | 4/1970 | Fanslow | 74/482 |
| 3,602,062 | 8/1971 | Houk | 74/481 |
| 3,935,932 | 2/1976 | Moorhouse | 74/481 X |

Primary Examiner—Clarence R. Gordon
Attorney, Agent, or Firm—Frank L. Hart

[57] ABSTRACT

A dual braking arrangement is provided for a vehicle whereby setting the hand brake will not affect the positioning of the foot-brake pedal and conversely the actuation of the foot-brake pedal will not affect the positioning of the hand-brake lever. A split linkage is provided whereby the brake actuator is splined to a dual operative lever, such that actuation of the dual operative lever by either the linkage connected to the hand-brake lever or the linkage connected to the foot-brake pedal, will actuate the brake.

11 Claims, 5 Drawing Figures

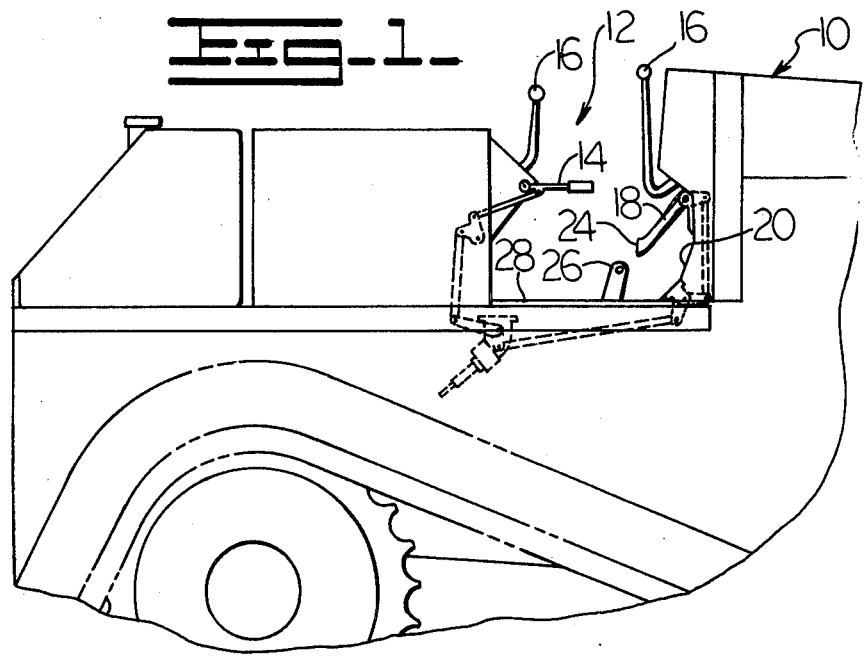
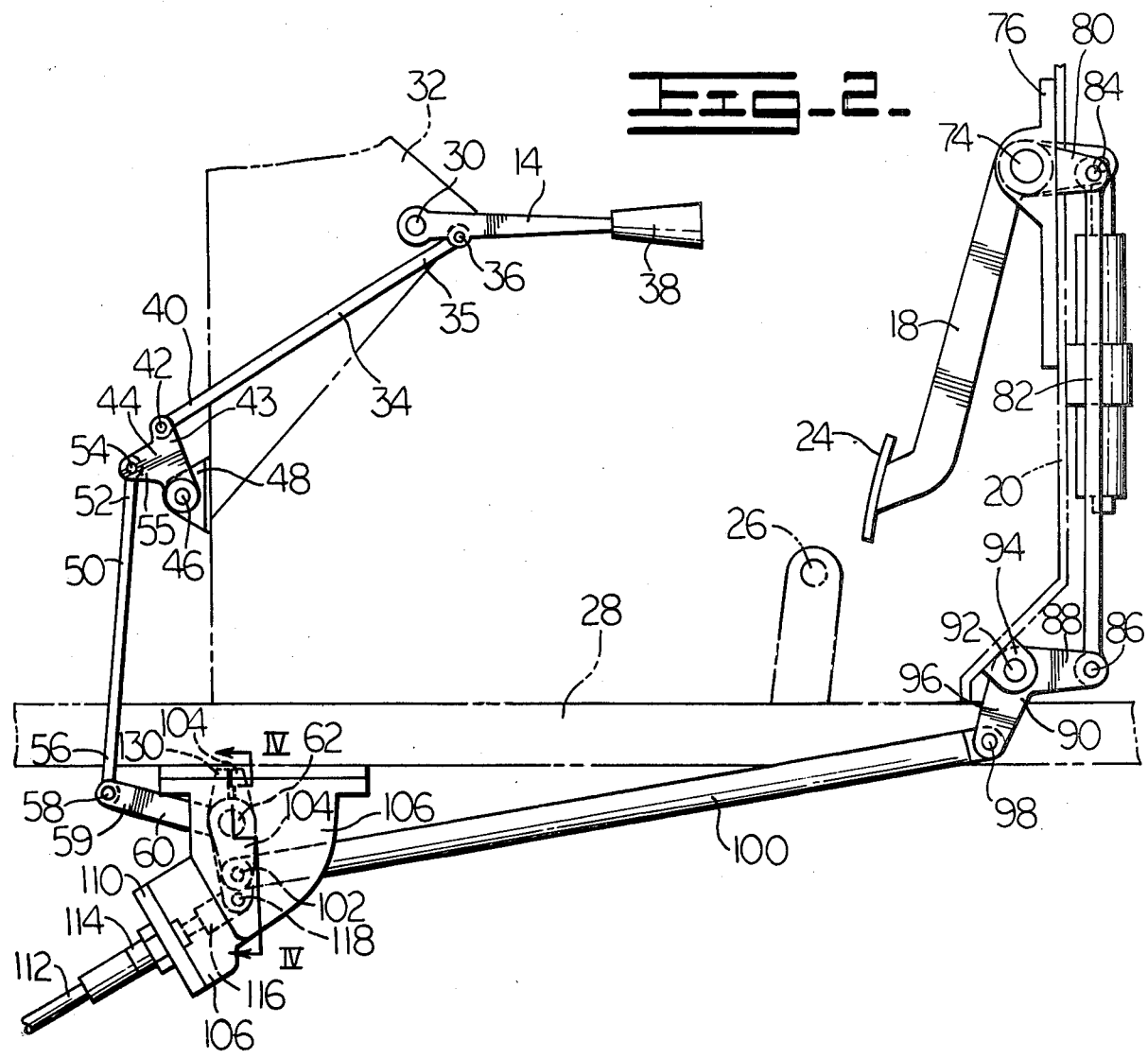

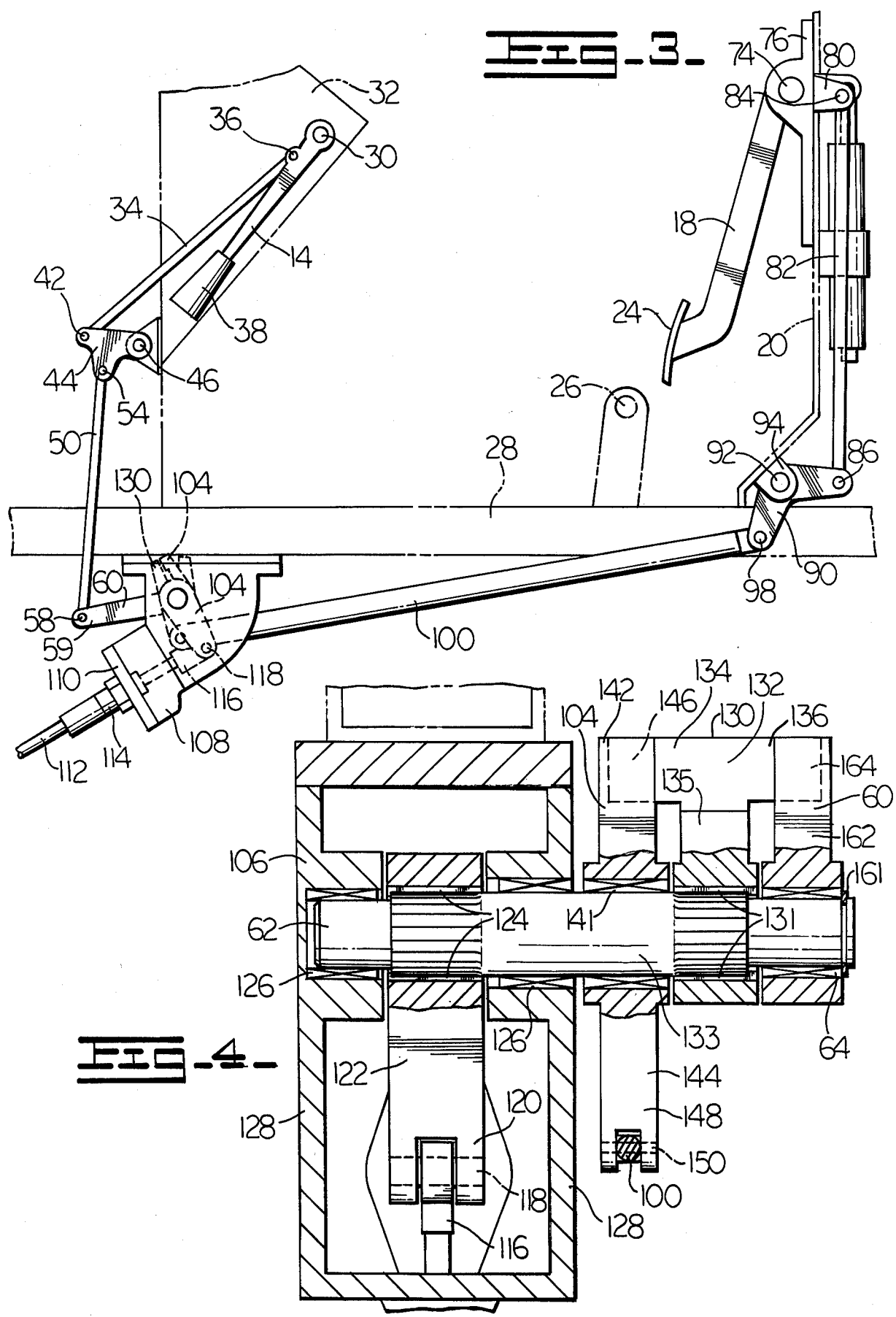

SPLIT LINK ACTUATOR BRAKE

BACKGROUND OF THE INVENTION

1. Field of the Invention

This invention relates to vehicle brake actuating arrangements and, more particularly, to a vehicle brake control whereby the hand-brake lever and the foot-brake pedal can be independently operated without interference with each other.

2. Description of the Prior Art

Vehicles have had both safety hand brakes and foot brakes for many years. These current braking systems have linkages or cables which run from the foot pedal or hand lever all the way to the brake. Such systems require a considerable number of additional parts to convey the actuating force to the brake. In addition, the linkages or cables being strung out over considerable distances are subject to abuse and wear and can become disabled due to interference with extraneous parts or due to failure of parts of said linkages or cables.

In some systems, an individual brake actuator is actuated by more than one source, such as a hand lever and a foot pedal, but in such systems actuation of the brake actuator by the hand lever prevents actuation by the foot pedal and vice versa. In another system, actuation of the foot pedal will actuate part or all of the hand-lever linkage which can cause problems with the hand-lever linkage.

SUMMARY OF THE INVENTION

The present invention is directed to overcoming one or more of the problems set forth above.

According to the present invention, a vehicle brake actuator is provided whereby the vehicle brakes are actuated either by a foot-operated pedal or by a hand-operated handle, without interference from each other. A central brake actuator is provided for all wheels or tracks of the vehicle that are to be braked. A dual lever arrangement is provided whereby actuation of the foot pedal and associated linkage will actuate the dual lever and the brake without moving, or in any way activating, the hand-brake linkage. The dual lever arrangement also provides for actuation of the hand-brake handle and linkage whereby the dual lever is actuated to set the brake without moving, or in any way activating, the foot-brake linkage.

Actuation or failure of the hand-brake handle and linkage will in no way affect the actuation of the foot-brake pedal and linkage and, conversely, actuation or failure of the foot-brake pedal and linkage will in no way affect the actuation of the hand-brake handle and linkage. It is also possible to set both the hand brake and foot brake without one interfering with the other and when both the hand brake and foot brake are set, release of one will not release the vehicle brake until the other is also released.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a partial elevational view of a vehicle having both a hand-brake handle and a foot-brake pedal for actuating the vehicle brakes;

FIG. 2 is an elevational view of the improved dual linkage and lever arrangement for actuating the vehicle brakes;

FIG. 3 is an elevational view similar to FIG. 2 only showing the hand-brake lever in the brake set position;

FIG. 4 is a cross-sectional view taken along the line 4—4 of FIG. 2; and

DESCRIPTION OF THE PREFERRED EMBODIMENT

Figure 5:
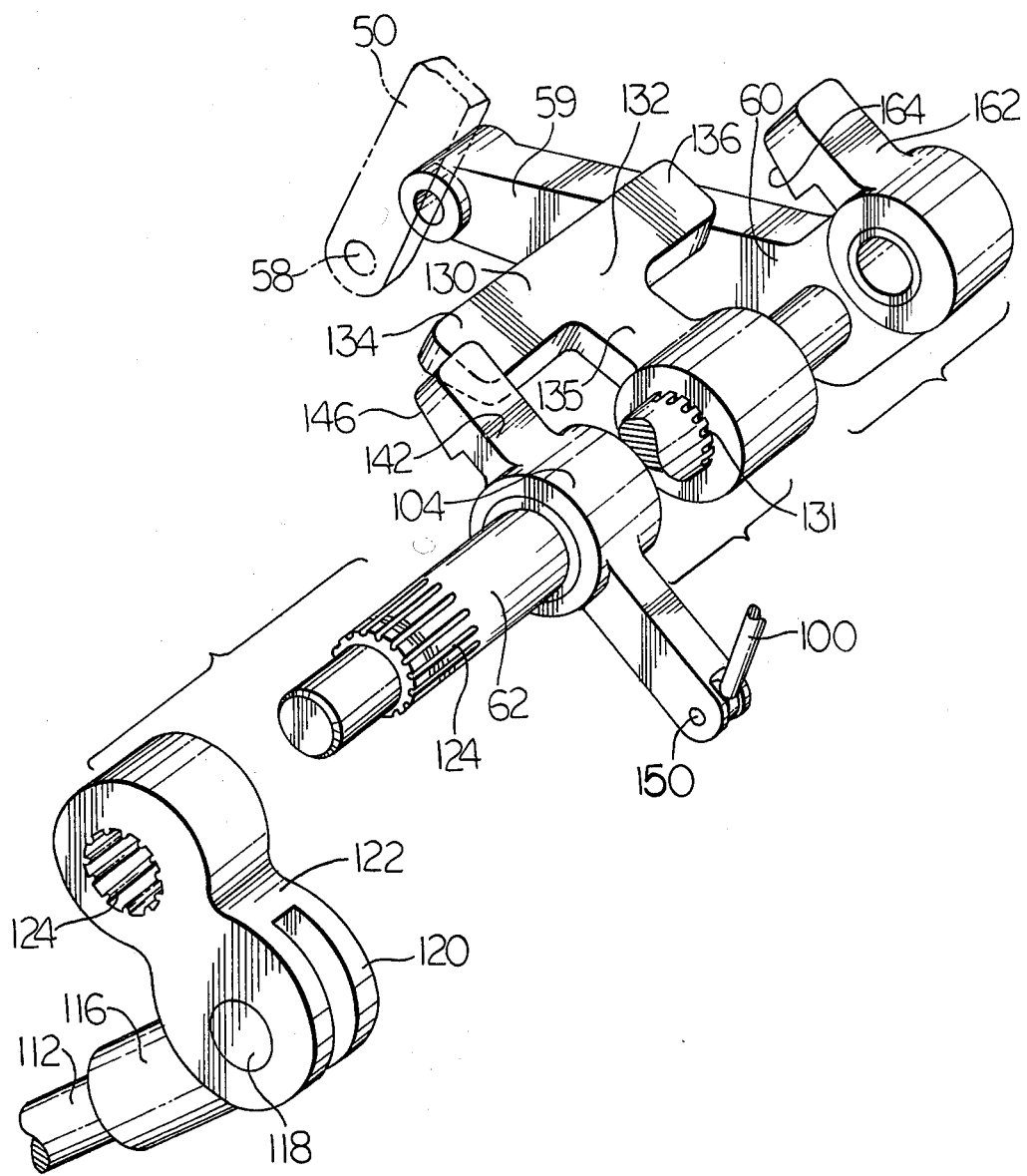
FIG. 5 is a perspective view, partially exploded, of the improved dual lever actuating arrangement.

Referring to the drawings, and in particular to FIG. 1 thereof, a vehicle 10 is illustrated which, in the form shown, is a track-type tractor. An operator's station 12 is located on the vehicle 10 such that an operator, when seated in the seat of the compartment, has access, by the use of his hands and feet, to the various handles 14, knobs 16, and pedals 18, and the like, for driving and steering the vehicle 10 and actuating various equipment on the vehicle. One hand-operated handle 14 is a hand brake and, as shown in FIG. 1, projects horizontally across the access area to and from the operator's compartment 12. A foot brake actuator lever 18 projects downwardly and rearwardly from the inside of the fire wall 20 of the vehicle 10 with a foot-engaging pedal portion 24 projecting toward the operator's station 12. A foot rest 26 is located close to the foot pedal 24 upon which the operator can rest his foot when it is not needed for other purposes, such as actuating the pedal 24 of the foot brake 18. The handle 14 of the hand brake extends horizontally substantially parallel to the floor or deck 28 of the operator's compartment 12 and obstructs access to and from the operator's compartment when the brake associated with the hand lever is in the "off" or "inoperative" position. An operator, to leave the operator's compartment 12, must maneuver over or around the horizontal handle 14 which is intended to remind him to set the hand brake on the vehicle. The hand brake is put in the "on" position by pivoting the handle 14 clockwise, as viewed in FIG. 1, downward and rearward from its horizontal position in a manner to be described more in detail hereinafter.

Referring to FIGS. 2 and 3, in particular, as they relate to FIG. 1, the handle 14 is pivotally mounted at 30 to the frame 32 of the vehicle 10. A connecting link 34 has one end portion 35 pivotally mounted at 36 to the handle 14 at an intermediate location between the hand grip portion 38 of the handle 14 and said pivot 30. The other end portion 40 of the connecting link 34 is pivotally mounted at 42 to one leg 43 of the bell crank link 44, which bell crank link 44, in turn, is pivotally mounted at 46 to a bracket 48 mounted on the frame 32. A second connecting link 50 is connected at one end portion 52 by means of a pivot 54 to a second leg 55 of the bell crank link 44 and is connected at its other end portion 56 by means of pivot 58 to one leg 59 of a lever 60. The lever 60 is pivotally mounted on a shaft 62 for a purpose to be described more in detail hereinafter. Comparing FIGS. 2 and 3, it can be seen that when the handle 14 is in the horizontal position of FIG. 2, the connection through the link 34, bell crank 44 and link 50 to the lever 60, positions the leg 59 of said lever 60 in a raised position relative to the horizontal. In FIG. 3, the handle 14 has been rotated about the pivot 30 in a clockwise direction which has pivoted the bell crank 44 in a counterclockwise direction through the link 34 and has pivoted the lever 60 counterclockwise through the link 50 so that in FIG. 3, the leg 59 of the lever 60 is in a lowered position relative to the raised position of FIG. 2.

Positioned to the left of the foot rest 26 is the foot-brake actuator lever 18 which supports the foot pedal 24 at the lower end thereof. The foot-brake actuator lever 18 is pivotally mounted about a pivot 74 which is supported by a bifurcated bracket 76 mounted on the fire wall 20 of the vehicle 10. The foot-brake actuator lever 18 has a transversely extending leg 80 integrally formed at the pivot end thereof and projects rearwardly through the fire wall 20 from the pivot 74 so that pivotal movement of the foot-brake actuator lever 18 about the pivot 74 will, likewise, move the leg 80 an equal amount. A connecting link 82 is pivotally mounted at pivot 84 to the outer end portion of the leg 80 with the opposite end portion of said link 82 being pivotally mounted at pivot 86 to the outer end portion of one leg 88 of a bell crank 90. The bell crank 90 is pivotally mounted at pivot 92 to a bracket 94 secured to the fire wall 20. The bell crank 90 has a second leg 96 pivotally connected at 98 to a connecting link 100. The opposite end portion of the connecting link 100 is pivotally mounted by means of pivot 102 to the lower end of a lever 104 which is rotatably mounted on said shaft 62. Thus, it can be seen that pressure applied to the pedal 24 of the foot-brake actuator lever 18 will pivot the lever 18 counterclockwise to raise the leg 80 and connecting link 82 thereby pivoting the bell crank 90 in a counterclockwise direction about the pivot 92. The counterclockwise movement of the bell crank 90 will move the link 100 to the right, as viewed in FIG. 2, which will pivot the lever 104 about the axis of the shaft 62 in a counterclockwise direction.

Referring to FIGS. 4 and 5, in combination with the structure described with respect to FIG. 2, it will be noted that a sealed housing 106 is bolted to the undersurface of the deck 28 and has a downwardly and angularly disposed sleeve 108 formed thereon. A plate 110 seals the opening at the end of the sleeve 108 with a rod 112 extending into the housing 106 through a sleeve guide bearing 114. The rod 112 is connected through a connector 116 to a pivot pin 118 extending between the bifurcated end 120 of a lever 122. The lever 122 is splined at 124 to the shaft 62 which shaft is rotatably mounted in bearings 126 in the side walls 128 of the housing 106. The shaft 62 projects laterally from the housing 106 and has a T-shaped lever 130 splined at 131 to the exposed end portion 133 of said shaft 62. The T-shaped lever 130 has a head portion 132 projecting axially in opposite directions from the shaft 135 of the "T" so as to provide independent overhanging contact pads 134, 136 on the outer end portions thereof. Since the T-shaped lever 130 is splined to the shaft 62 in the same manner as the lever 122 is splined to said shaft 62, rotational movement of the T-shaped lever 130 about the axis of the shaft 62 will rotate the lever 122 a like amount.

The lever 104 is rotatably mounted on the shaft 62 by a bearing 141 so that the lever 104 is free to rotate relative to the shaft 62. Lever 104 has a pair of radially and oppositely directed legs 142, 144 with the leg 142 having a contact pad 146 aligned with and adapted to selectively contact the contact pad 134 on the T-shaped lever 130. The leg 144 of the lever 104 has a bifurcated end portion 148 through which a pin 150 passes to engage with and secure the end portion of the link 100 to the lever 104. The lever 60, which has previously been described as being rotatably mounted on the outer end portion of the shaft 62, is rotatably supported by a bearing 64 and is secured against axial displacement from the shaft 62 by means of a snap ring 161. The lever 60 has one short leg 162 which extends radially outward from the body of the lever 60 and has a contact pad 164 aligned with and adapted to selectively contact the contact pad 136 of the T-shaped lever 130. The lever 60 has the elongate leg 59 extending radially outward from the body of said lever 60 along an axis angularly disposed from the axis of the leg 162. The outer end portion of the leg 59 is pivotally secured by pivot 58 to the one end portion 56 of the connecting link 50. From the above, it will be noted that the levers 104 and 60 are free to rotate independent of each other and independent of the shaft 62, the lever 104 being actuated by movement of the connecting link 100, bell crank 90, link 82 and foot-brake actuator lever 18, and the lever 60 being actuated by movement of the connecting link 50, bell crank 44, link 34, and hand brake 14.

It should be noted that the handle 14, when in the position of FIG. 2, positions the lever 60 so that the short leg 162 extends substantially straight upward with respect to the shaft 62. When the handle 14 is pivoted in a counterclockwise direction to the position of FIG. 3, the links 34 and 50, through the bell crank 44, will pivot the lever 60 in a counterclockwise direction so that the short leg 162 will pivot in a counterclockwise direction, as viewed in FIGS. 2 and 3, so that the contact pad 164 will engage with the contact and 136 on the T-shaped lever 130 which will rotate the lever 130, shaft 62 and lever 122 in a counterclockwise direction, once again as viewed in FIGS. 2 and 3. The counterclockwise movement of the end portion 120 of the lever 122 will move the rod 112 to the right, as viewed in FIG. 2, to the position of FIG. 3 which will set the brakes of the vehicle. It should be noted that the lever 104 is in no way affected by the movement of the levers 60 and 130 as that the position of the foot pedal 24 is not altered.

In normal operation, the hand-brake handle 14 will be in the horizontal position of FIG. 2 such that the lever 60 will have the leg 162 in the vertical position, out of contact with the lever 130. As the vehicle is operated, it becomes necessary to brake the vehicle by the operator depressing the pedal 24 which will pivot the foot-brake actuator lever 18 about the pivot 74 which will raise the link 82, pivot the bell crank 90 in a counterclockwise direction, and shift the link 100 to the right, as viewed in FIG. 2, which, in turn, will pivot the link 104 in a counterclockwise direction, as viewed in FIG. 2, whereupon the leg 142 of the lever 104 will be pivoted in a counterclockwise direction with the pad 146 contacting the contact pad 134 of the link 130. This will rotate the link 130, shaft 62 and lever 122 in a counterclockwise direction which will shift the rod 112 and set the brake. It should be noted that actuation of the foot brake will in no way affect the position of the hand brake so that the link or lever 60 connected to the hand brake 14 will remain in position with the contact pad 164 out of contact with the contact pad 136 of the lever 130.

It should be noted that in the event the foot brake is set, as just described, the operator can pivot the handle 14 of the hand brake from the horizontal position of FIG. 2 to the set position of FIG. 3 which will pivot the lever 60 so as to bring the contact pad 164 in contact with the contact pad 136 of the lever 130. Since the brake is already set, this will in no way change the position of the rod 112. However, in the event the operator removes his foot from the pedal 24 of the foot-brake actuator lever 18, the connecting link 82, bell crank 90, and link 100 will be free to shift in a clockwise direction, as viewed in FIG. 2, so as to remove the contact pad 146 from contact with the contact pad 134 of the lever 130. However, the brakes will remain set due to the set position of the hand brake. The operator at that point can release the hand brake by grasping the handle 14 and rotating the handle 14 in a counterclockwise direction, as viewed in FIG. 3, to the horizontal position of FIG. 2, whereupon the lever 60 will be rotated in a clockwise direction which will permit the lever 130 to rotate in a clockwise direction thereby shifting the rod 112 and releasing the brake.

In summary, a dual brake actuating mechanism has been described wherein a hand brake can be set without in any way affecting the operation or position of the foot brake and foot-brake lever. Likewise, the foot brake can be set without in any way affecting the position of the hand-brake lever and hand-brake handle. In other words, one or the other of the brake actuating mechanisms can be operated without affecting the other's position or operation. Both brakes can be set at the same time and the release of one will not automatically release the other, therefore, it requires a positive action to release either or both of the brakes, which brakes are independently operative.

The embodiments of the invention in which an exclusive property or privilege is claimed are defined as follows:

1. In an actuator for a brake for a vehicle having a single actuating rod for said brake, a housing for mounting one end of said rod for axial movement for actuating said brake, a shaft rotatably mounted in said housing along an axis transverse to the axial movement of said rod, a first lever fixed to said shaft and operatively connected to said rod, a second lever fixed to said shaft and having a pair of contact pads thereon, a third lever pivotally mounted on said shaft and having one leg aligned with one of said pair of contact pads on said second lever, means for rotating said third lever relative to said shaft upon actuation of a hand-brake lever on said vehicle, a fourth lever pivotally mounted on said shaft and having one leg aligned with the second one of said pair of contact pads on said second laver, means for rotating said fourth lever relative to said shaft upon actuation of a foot-brake pedal on said vehicle, whereby movement of said second lever selectively by said third lever and said fourth lever independently rotates said shaft and said first lever to set said brakes on the vehicle.

2. In the actuator for the brake as claimed in claim 1 wherein said means for rotating said third lever comprises a handle pivoted on said vehicle, a link connecting the midportion of said handle to a pivoted bell crank, a link connecting said bell crank to a second leg on said third lever whereby movement of said handle moves said links and bell crank to rotate said third lever and move said one leg on said third lever into contact with said aligned contact pad on said second lever to rotate said first and second levers and to set said brake.

3. In the actuator for the brake as claimed in claim 1 wherein said means for rotating said fourth lever comprises a foot-operated lever pivoted to said vehicle, a link carried by said foot-operated lever and connected to a pivotally mounted bell crank, is second link connected to said bell crank and to a second leg of said fourth lever whereby movement of said foot lever moves said links and bell crank to rotate said fourth lever and move said one leg on said fourth lever into contact with the contact pad on said second lever to rotate said first and second levers and to set said brake.

4. An actuator for a brake on a vehicle, an actuating rod for said brake, a housing means for mounting one end of said rod for axial movement relative to said housing, a shaft rotatably mounted in said housing, means keyed to said shaft and affixed to said rod, second means keyed to said shaft and having contact pads thereon, third means pivotally mounted on said shaft and having one leg aligned with said contact pads on said second means, means for rotating said third means relative to said shaft upon actuation of a hand-brake lever on said vehicle, fourth means pivotally mounted on said shaft and having one leg aligned with said contact pads on said second means, means for rotating said fourth means relative to said shaft upon actuation of a foot-brake pedal on said vehicle, whereby movement of said second means by said third means and said fourth means rotates said shaft and said first means to set said brakes on the vehicle.

5. An actuator for a brake as claimed in claim 4 wherein said means for rotating said third means comprises a handle pivoted on said vehicle, a link connecting an intermediate portion of said handle to a pivoted bell crank, a link connecting said bell crank to a second leg on said third means whereby movement of said handle moves said links and bell crank to rotate said third means and move said one leg on said third means into contact with said aligned contact pad on said second means to rotate said first and second means and to set said brake.

6. An actuator for a brake as claimed in claim 4 wherein said means for rotating said fourth means comprises a foot-operated lever pivoted to said vehicle, a link connected to said foot-operated lever and to a pivotally mounted bell crank, a second link connected to said bell crank and to a second leg on said fourth means whereby movement of said foot lever moves said links and bell crank to rotate said fourth means and move said one leg on said fourth means into contact with the contact pad on said second means to rotate said first and second means and to set said brake.

7. An actuator for a brake as claimed in claim 1 wherein said first lever and said second lever are splined to said shaft.

8. In a vehicle having a brake, a rod axially movable to actuate said brake, a housing for supporting said rod and means for axially moving said rod for setting and releasing said brake, in combination, said means comprising a shaft rotatably mounted in said housing, a lever splined to said shaft and operatively connected to said rod, means splined to said shaft for rotation therewith, a first means rotatably mounted on said shaft and having a portion selectively in contact with said means splined to said shaft, a hand-brake handle operatively connected to said first means for moving said first means into contact with said means splined to said shaft, second means rotatably mounted on said shaft and having a portion selectively in contact with said means splined to said shaft, a foot-brake pedal operatively connected to said second means for moving said second means into contact with said means splined to said shaft whereby independent actuation of said hand-brake handle and said foot-brake pedal will move said lever and rod to set said brake.

9. In a vehicle as claimed in claim 8 wherein said means splined to said shaft is a lever having two contact pads aligned with said first and second means.

10. In a vehicle as claimed in claim 9 wherein said first means is a lever having a contact portion for contacting one of said aligned contact pads.

11. In a vehicle as claimed in claim 10 wherein said second means is a lever having a contact portion for contacting the other of said aligned contact pads.

* * * * *

UNITED STATES PATENT AND TRADEMARK OFFICE
CERTIFICATE OF CORRECTION

PATENT NO. : 4,086,824

DATED : May 2, 1978

INVENTOR(S) : David G. Johnson

It is certified that error appears in the above-identified patent and that said Letters Patent are hereby corrected as shown below:

Column 4, line 29, cancel "and" and insert therefor --pad--.

Column 5, line 44, cancel "laver" and insert therefor --lever--;
line 65. cancel "is" and insert therefor --a--.

Signed and Sealed this

Seventeenth Day of October 1978

[SEAL]

Attest:

RUTH C. MASON
*Attesting Officer*

DONALD W. BANNER
*Commissioner of Patents and Trademarks*